United States Patent [19]
Hatfield

[11] 4,202,290
[45] May 13, 1980

[54] APPARATUS FOR DECORATING SURFACES OF CERAMIC WARE

[75] Inventor: David G. Hatfield, La Canada, Calif.

[73] Assignee: Interpace Corporation, Parsippany, N.J.

[21] Appl. No.: 915,408

[22] Filed: Jun. 14, 1978

Related U.S. Application Data

[60] Continuation of Ser. No. 786,189, Apr. 11, 1977, abandoned, which is a division of Ser. No. 660,489, Feb. 23, 1976, abandoned.

[51] Int. Cl.² .............................................. B05C 1/02
[52] U.S. Cl. ...................................... 118/211; 101/41; 118/243
[58] Field of Search ............... 118/211, 243, 263, 401, 118/506, 225, 255; 101/41

[56] References Cited

U.S. PATENT DOCUMENTS

| | | | |
|---|---|---|---|
| 834,181 | 10/1906 | Bell | 101/41 |
| 3,099,581 | 7/1963 | Hanson | 118/263 X |
| 3,404,025 | 10/1968 | Wootten | 118/401 X |
| 3,776,184 | 12/1973 | Harrison | 118/243 |

*Primary Examiner*—John P. McIntosh
*Attorney, Agent, or Firm*—Poms, Smith, Lande & Rose

[57] ABSTRACT

A method of decorating a surface of a ceramic body in which a thin uniform film of colorant composition material is carried by a decorating member in a suspended state across an opening of selected area and shape corresponding to the designs to be applied to the surface of said body, the colorant material being deposited thereon by breaking the surface tension of the suspended film by contact with said surface. An apparatus for decorating a surface of a ceramic body including a receptacle for the colorant composition material, decorating members for holding one or more films of colorant composition material in a suspended state across openings configured to the shape of the design to be applied to the ceramic body; said decorating members being movable to immerse said decorating members in said colorant composition material and to deposit under gravitational forces said film on said surface.

4 Claims, 23 Drawing Figures

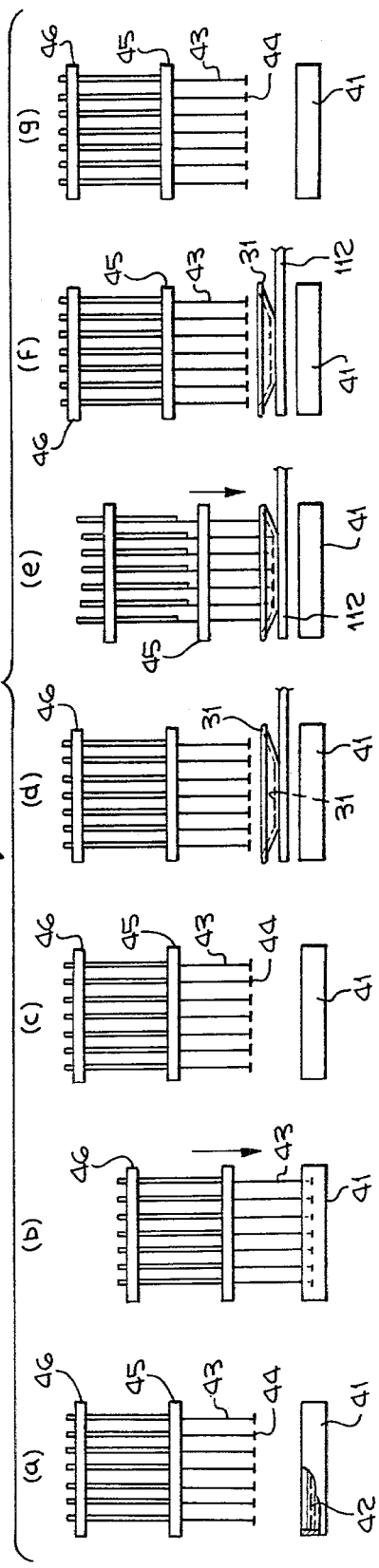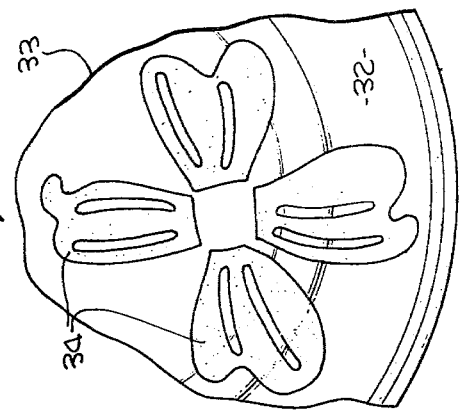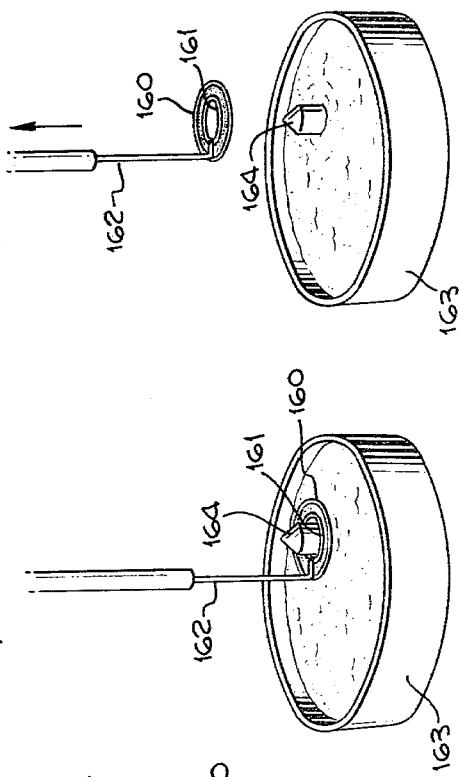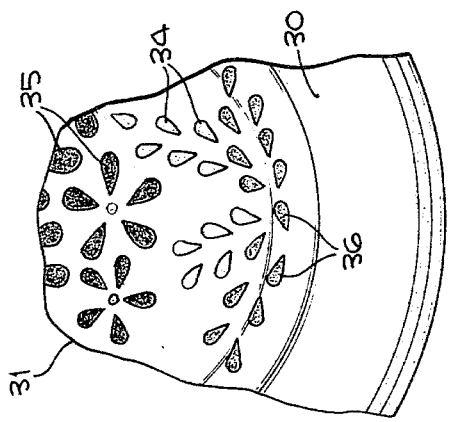

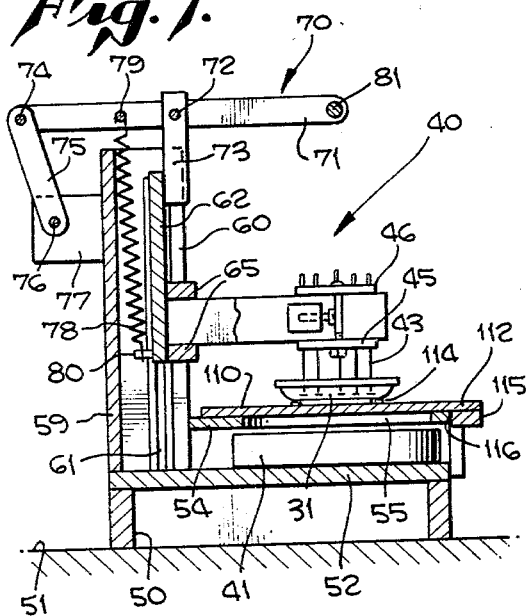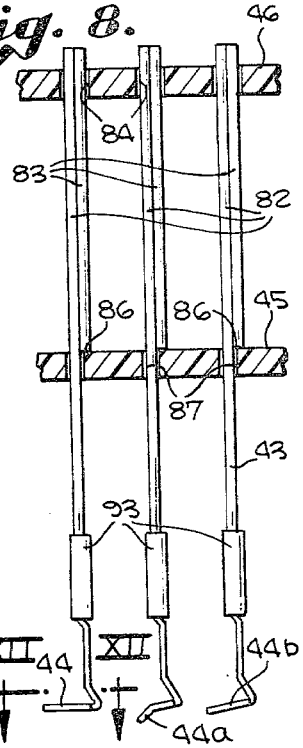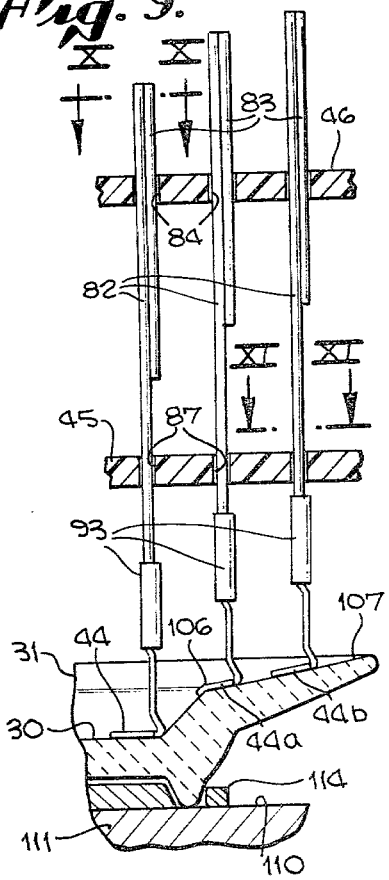

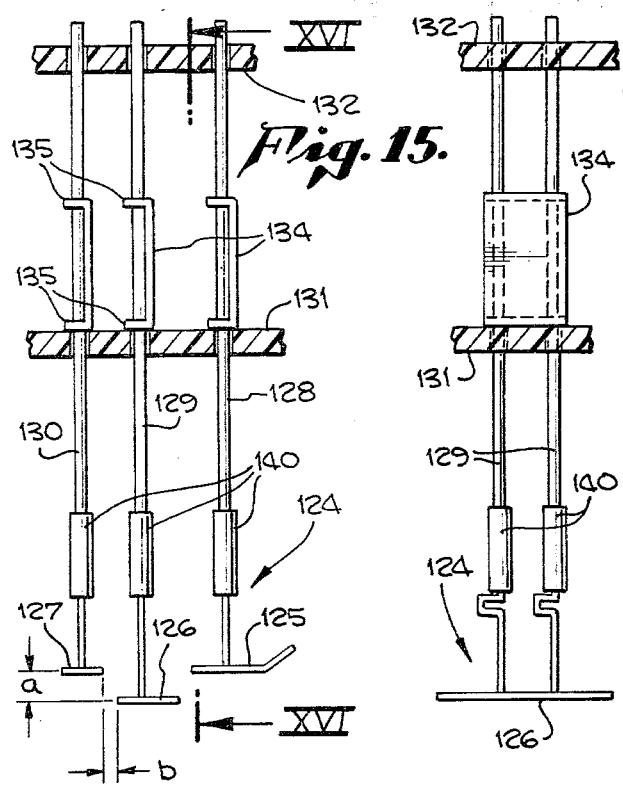
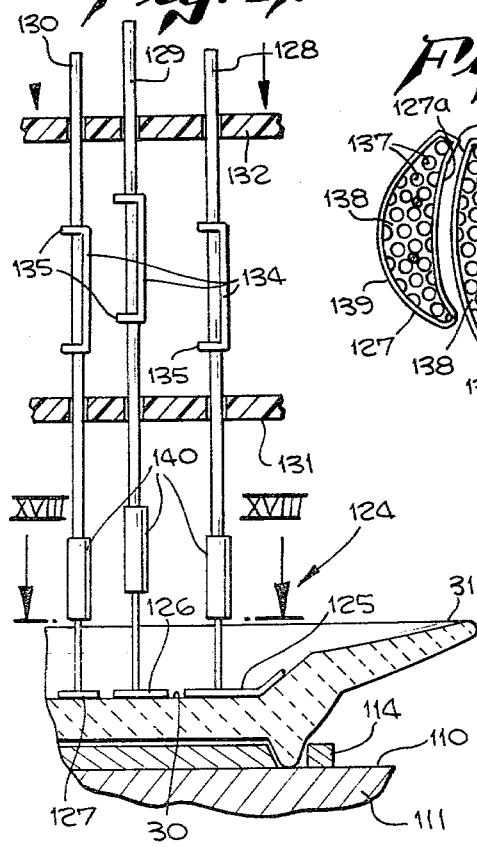
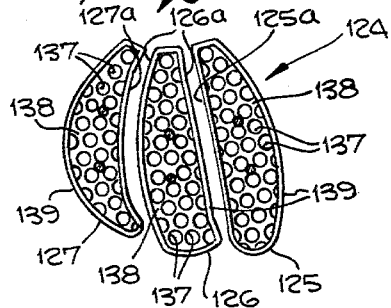
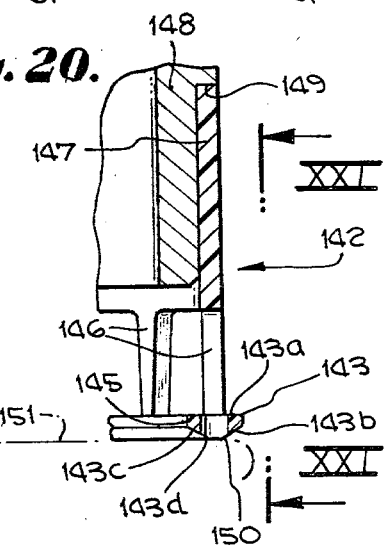
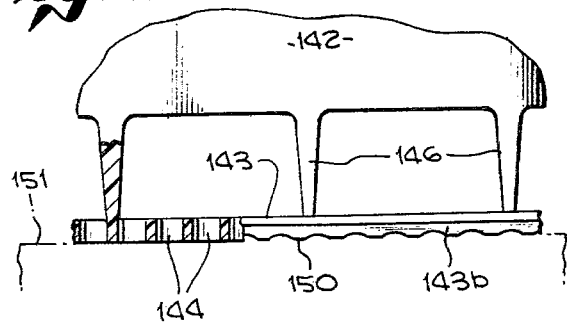

APPARATUS FOR DECORATING SURFACES OF CERAMIC WARE

This is a continuation of application Ser. No. 786,189 filed Apr. 11, 1977, now abandoned which is a divisional application of Ser. No. 660,489 filed Feb. 23, 1976, now abandoned.

BACKGROUND OF INVENTION

Surfaces of articles of dinnerware, hollow ware, tile and various pieces of art ware have been decorated in various ways. Decoration of such ware by hand painting required considerable skill, talent, and care in order to produce many pieces of dinnerware which appeared attractive and closely similar. Hand painting was, of course, very time consuming but was valued for its artistic hand crafted appearance.

Mechanical methods of applying decorative colorant materials to the surface of ceramic ware included stenciling, stamping, lithographic and silk screen decalcomania, transfer printing, and direct and indirect screen printing. In each of these latter methods the decorative material could be rapidly applied to surfaces with substantial uniformity. However, some of the artistic hand crafted appearance of the decorative design was lost.

Still other methods of applying decorative colorant composition material to the surface of ceramic ware have included hand bulbing and automatic or machine bulbing. Hand bulbing included the careful manual deposition as by pressure squeezing a bulb to cause flow of colorant material on a surface within the confines of a stamped or marked pattern. Uniformity of pattern was achieved, but hand bulbing was still a slow process for decorating articles such as dinnerware. Decoration of dinnerware by automatic machine bulbing is described in U.S. Pat. No. 3,885,552 owned by the assignee of this invention and application.

In each of the prior proposed methods of decorating a surface of ceramic ware, colorant material was applied by flowing, stamping or printing a quantity of colorant material onto the ceramic surface, the amount of colorant material applied being controlled by either the skill of the operator or the amount of material carried by the stamp or transfer devices. In such methods, the definition of the design was dependent upon the skill of the operator or predetermined by the configuration of the stencil, decalcomania, silk screen, the delineation of the pattern on the transfer medium, or the delineation of the pattern on the ware itself.

Thus in prior proposed methods of decorating ceramic ware, the amount of colorant material applied to the ceramic surface was under the immediate control of the operator and uniformity of pattern often depended upon his skill in applying the colorant material. The latter characteristic was not true of automatic bulbing as described in said Letters Patent because a mold provided pattern defining edges and an excess quantity of material was used in the mold pattern openings for deposition on the surface being decorated, excess material being withdrawn from said surface after a selected time period had lapsed.

Ceramic surfaces to be decorated are often not flat and include surfaces curved in three dimensions. Prior proposed apparatus for stamping or applying a composition material to a three dimensionally curved surface have included use of vertically reciprocal rods spring biased in one direction and each adapted to carry a stamp head or other printing means. Such vertically reciprocal rods were supported by a flat plate, the rods extending through the plate and having a collar thereon against which one end of a biasing spring was seated so that when the article was brought into position for application of the design, movement of the plate would cause the printing end of the rods to be moved against the three dimensional surface to stamp or print the design on the surface. Such prior methods and apparatus are illustrated in U.S. Pat. Nos. 834,181; 1,515,561; 1,928,715; 2,372,089; 2,437,224; and 2,623,452.

It has also been known to place a wire loop on the end of a handle and manually dip the wire loop into a body of fluid material to cause the material to form a film extending across the wire loop and to then manually place the wire loop on a surface to deposit the fluid material on the surface in the configuration of the wire loop. Such manual deposition of a decorative material on a surface depended upon the skill and carefullness of the operator in bringing the wire loop into proper contact with the surface at a selected location on the surface. Accurate manual repetition of a pattern on different surfaces was imprecise and time consuming.

SUMMARY OF INVENTION

The present invention contemplates an apparatus for rapidly repetitively reproducing virtually identical patterns on a plurality of different surface areas at one or more decorating stations. The invention more specifically relates to an apparatus and a method for decorating ceramic ware wherein the surface of the ceramic ware may be porous or nonporous and wherein the colorant composition material deposited on said surface is provided a surface tension characteristic which assures that the decorating member carrying the colorant material deposits a virtually uniform amount of said colorant material on each application. The invention contemplates that the method and apparatus produce a design or pattern on a surface of ceramic ware which tends to exhibit some of the hand crafted styling and characteristics of hand applied designs.

Generally speaking, the invention contemplates an apparatus including one or more decorating stations through which a piece of ceramic ware may be sequentially passed. Each decorating station includes a receptacle for colorant material, one or more decorating members held in fixed spaced relation to provide a selected or desired pattern, each of said decorating members including an opening defined by relatively thin element whereby upon dipping or immersion of the decorating member into the receptacle of colorant material a film of the colorant material will be suspended across the area of the opening and conform to the shape of the decorating member and to that selected portion of the design or pattern. The apparatus includes means for raising the decorating members so that a piece of ceramic ware may be placed therebeneath and the decorating members then lowered to contact the surface of the ceramic ware under only gravitational forces to break the surface tension which holds the suspended film in the opening and to permit the film in its selected configuration to be deposited upon the surface of the ceramic ware. The apparatus includes means for restraining the decorating members against changes in position except for vertical position changes which are permitted to accommodate the decorating member to surfaces of different vertical configuration. The apparatus includes a selected number of stations depending upon the design and number of different colors to be used in the selected design.

It is therefore a primary object of the present invention to provide an apparatus for decorating ceramic ware wherein a selected amount of colorant composition material in a selected configuration is deposited upon a surface of ceramic ware by contacting a thin, suspended film of the colorant material with the surface to break the surface tension of the film and cause release of the colorant material from the decorating member.

An object of the present invention is to provide an apparatus for decorating ceramic ware wherein a plurality of decorating members are supported for vertical reciprocal movement at a decorating station which includes a receptacle containing colorant composition material; the decorating members being arranged in fixed pattern defining relation and are movable in such fixed relation to apply a selected design to a surface of the ceramic ware.

A further object of the present invention is to provide an apparatus for decorating ceramic ware wherein decorating members include openings of selected area and configuration defined by thin, peripheral elements which are adapted to carry a suspended film of selected colorant composition material for deposit on a surface of ceramic ware in a shape corresponding to the shaped area of the decorating elements. The invention contemplates various modifications of such decorating members whereby the aggregate area of the deposit of the colorant composition material may be expanded beyond that normally attainable by the surface tension characteristics of the colorant material; the arrangement of decorating members whereby closely adjacent separate and independent configurations may be applied to the surface of ware without intermixing of the deposited material at adjacent edges thereof unless so desired; and the utilization of sheet material provided with a plurality of openings or perforations the aggregate area of which substantially exceeds the area of the material defining said openings.

An important object of the invention is to provide a method for decorating a ceramic surface wherein a precise quantity of flowable colorant material in a plurality of preshaped discrete pattern or design parts or components are removed from a body of colorant material and retained in such preshaped design or part form by surface tension of the material, and then released on a ceramic surface in such precise quantity and shape by contacting under gravitational forces the material with the surface to break the surface tension.

Various other objects and advantages of the present invention will be readily apparent from the following description of the drawings in which exemplary embodiments of the apparatus and method of the invention are now shown.

In the Drawings

FIG. 1 is a schematic view of the several steps of practicing the method of this invention for decorating the surface of a piece of dinnerware.

FIG. 2 is a fragmentary enlarged view of an example of the type of design on a dinnerware surface made by the method and apparatus of this invention.

FIG. 3 is a fragmentary enlarged top view of a different design applied to a surface of a dinnerware by the method and apparatus of this invention.

FIG. 7 is a sectional view taken in the vertical plane indicated by line VII—VII of FIG. 4.

FIG. 8 is a fragmentary enlarged sectional view of a plurality of decorating members supported by the apparatus shown in FIG. 4.

FIG. 9 is a fragmentary enlarged view of the decorating members shown in FIG. 8 and illustrating the decorating members in a position applying colorant composition material to the surface of a piece of dinnerware.

FIG. 10 is a fragmentary enlarged transverse sectional view taken in the plane indicated by line X—X of FIG. 9.

FIG. 11 is an enlarged fragmentary sectional view taken in the transverse plane indicated by line XI—XI of FIG. 9.

FIG. 12 is an enlarged fragmentary view of the decorating element of one of the decorating members, the view being taken from the plane indicated by line XII—XII of FIG. 8.

FIG. 13 is a sectional view taken in the plane indicated by line XIII—XIII of FIG. 12.

FIG. 14 is a vertical exploded view of a decorating member shown in FIG. 8 illustrating its construction.

FIG. 15 is a fragmentary enlarged view of a different modification of the plurality of decorating members of this invention.

FIG. 16 is a sectional view taken in the vertical plane indicated by line XVI—XVI of FIG. 15.

FIG. 17 is a fragmentary sectional view of the modification of decorating members shown in FIG. 15 and illustrating their application to the surface of a piece of dinnerware.

FIG. 18 is a top view taken from the horizontal plane indicated by line XVIII—XVIII of FIG. 17.

FIG. 19 is a sectional view taken in a vertical plane through one of the decorating stations shown in the prior embodiments, the decorating station being modified to show a still further modification of the decorating member of this invention.

FIG. 20 is an enlarged sectional view taken in a vertical plane through the periphery of the decorating member shown in FIG. 19 and illustrating its construction.

FIG. 21 is a view taken from a vertical plane indicated by the line XXI—XXI of FIG. 20, the view being partly in section to better illustrate the construction of the modified decorating member.

FIG. 22 is a schematic view of still another modification of the decorating member to form hollow peripheral shapes.

FIG. 23 is a further perspective view of the decorating member shown in FIG. 22 and illustrating the annular configuration of the design carried by this modified decorating member.

Figure 4:
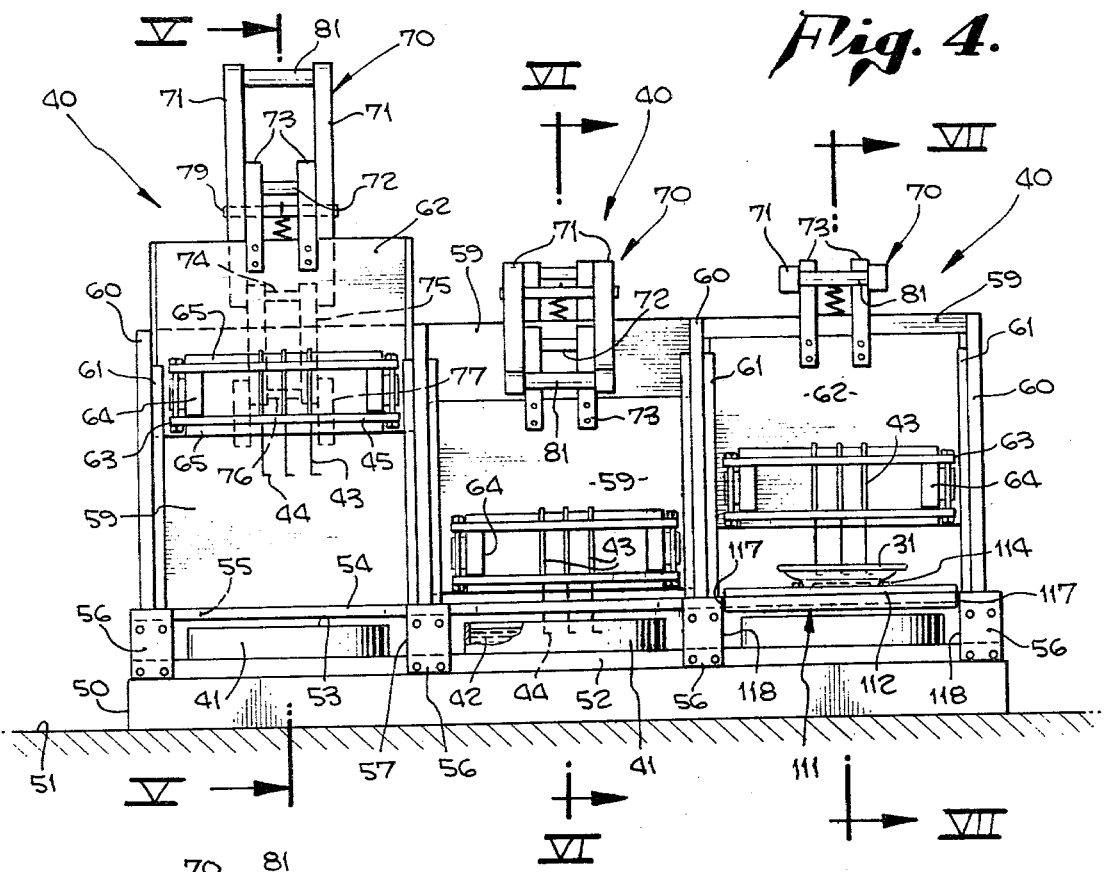
FIG. 4 is a front elevational view of an apparatus embodying this invention showing three decorating stations.
Figure 5:
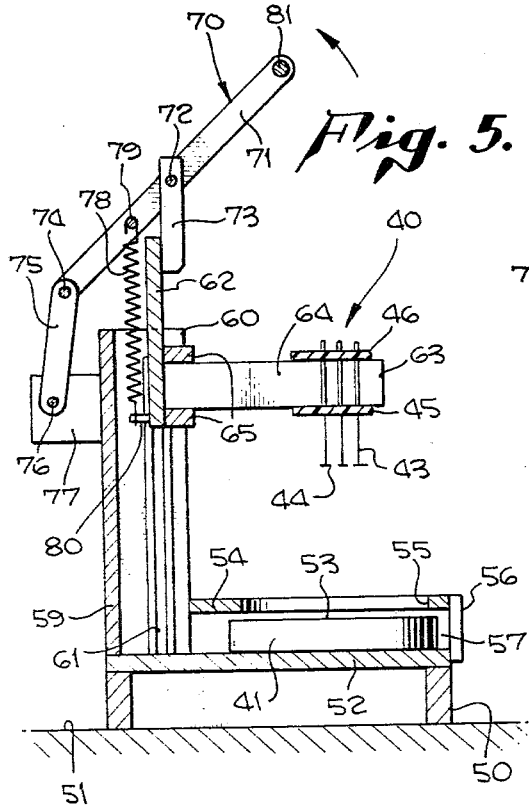
FIG. 5 is a sectional view taken in the vertical plane indicated by line V—V of FIG. 4.
Figure 6:
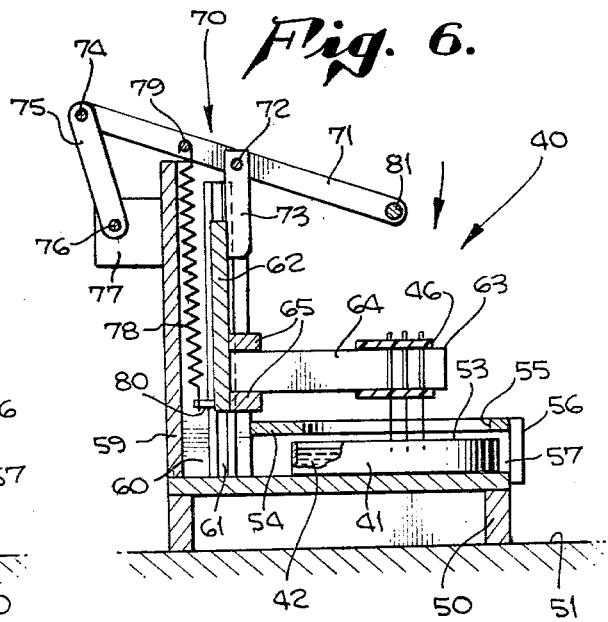
FIG. 6 is a sectional view taken in the vertical plane indicated by line VI—VI of FIG. 4.

Generally speaking, the method and apparatus of this invention as shown in the drawings is employed to decorate the surface of a ceramic body such as the top surface 30 of a dinnerplate 31, FIG. 2; or as shown in FIG. 3 the top surface 32 of a dinnerplate 33. The dinnerplates 31, 33 illustrate different designs in fragmentary form applied to their surfaces by the apparatus and method of this invention. The design shows, in FIG. 2, a plurality of petals 34 of one color, a plurality of petals 35 of a different color, and a plurality of petals 36 of still a different color. Petals of the same color are applied to the surface of the dinnerware at a decorating station at which the several steps of the method of this invention are performed as schematically shown in FIG. 1.

In addition to a piece or body of ceramic ware, the apparatus of this invention includes at each decorating station generally indicated at 40, a receptacle means 41 containing a liquid or semi-liquid colorant composition material 42, a plurality of decorating members 43 having decorating elements 44 at their bottom ends, and spaced plate means 45 and 46 for supporting and guiding said decorating members. Decorating elements 44 are specially configured to produce the individual petal designs 34, 35, or 36 as later described. Generally, in the method of this invention, the decorating elements 44 are held above the liquid colorant material 42 (FIG. 1(a)), are lowered into the colorant material 42, FIG. 1 (b), are lifted out of the colorant material with a film thereon retained by surface tension, FIG. 1 (c), while held in lifted position of a body of ceramic ware such as 31 is moved into selected registration beneath the decorating elements 44. When ceramic ware 31 is positioned the decorating elements are lowered to touch the surface 30 of the dinnerware 31 to release the film, FIG. 1(e), and after momentarily resting upon the surface 30 the decorating elements are lifted upwardly FIG. 1 (f) so that the decorated dinnerware may be withdrawn from the space between receptacle 41 and the decorating members 43 FIG. 1 (g).

The apparatus 40 at each station is exemplary and is shown in FIGS. 4–7 inclusive. Three decorating stations 40 are shown in FIG. 4. Each decorating station includes similar structure and for brevity and clarity only one decorating station will be described. Each decorating station includes a base 50 supported upon a suitable surface 51, the base including a flat member 52 upon which receptacle 41 may be suitably positioned. Receptacle 41 has an open top 53 for convenient access to the surface of the colorant composition material 42. Also supported by base 50 and spaced above the open top of the receptacle 42 is a top member 54 having an opening 55 therein of substantially the same size and shape as receptacle 41. The front edges of members 52, 54 are connected by vertical cleats 56 which define a front opening 57 through which receptacle 41 may be moved for proper positioning upon member 52 beneath the opening 55.

A back wall 59 is provided at the back edge of base 50 and member 52. Extending forwardly from back wall 59 are a plurality of spaced parallel vertical guide members 60 which serve to define a decorating station with respect to the position of receptacle 41. Opposed faces of member 60 may be provided with channel members 61 lying in the same vertical plane to provide slidable guide means for vertical edge portions of a vertical movable plate 62. The front face of plate 62 supports in suitable manner a horizontally extending open rectangular frame means 63 including side members 64 and suitable transverse members 65 for securing side members 64 in horizontal position or in normal position relative to the front face of movable plate 62. Side members 64 support and may have fixed thereto transversely extending support and guide members 45, 46 for a plurality of decorating members 43.

In this embodiment of the invention, means for moving the movable plate 62 with the plurality of decorating members 43 positioned forwardly therefrom by the forwardly extending side wall 64 may include a manually operated handle means 70 including spaced bars 71 pivotally mounted intermediate ends of the handle means 70 about a horizontal axis 72 provided by a pair of upwardly extending bars 73 secured in suitable manner to the central portion of the movable plate 62. The rearward end of handle means 70 is pivotally connected at 74 to the upper end of a link means 75 having a pivotal connection at 76 at the links lower end to a rearwardly projecting bracket 77 on the back wall 59. Suitable spring means 78 is connected at its upper end to a pin 79 carried by bar 71 between pivotal connections 72 and 74. The lower end of spring 78 may be connected to a pin 80 carried on the back surface of movable plate 62.

Plate 62 and the decorating members 43 carried thereby may be conveniently vertically lowered and raised by grasping the transverse handle 81 carried by bars 71 and pulling downwardly thereon so that the slidably guided plate 62 is vertically lowered until the decorating members 43 reach the receptacle 41. Lifting of the decorating members 43 from the receptacle 41 is readily accomplished by lifting upwardly on the handle 81, the spring 78 assisting in such lifting motion.

A decorating member 43 is best shown in FIG. 14 and includes a cylindrical metal rod 82 about 3/32 to ⅛ inch in diameter and having a smooth outer surface. The upper portion of rod 82 may have welded to it a rod portion 83 having a length greater than the distance between plates 45 and 46 including the thickness of the upper plate 46 and extending therebeyond as seen in FIG. 8. Rod portion 83 secured in parallel relation to the upper portion of rod 82 provides a cross sectional configuration having a major axis and a minor axis. Upper plate 46 is provided with openings 84 therethrough of oval shape having major and minor axes slightly greater than the axes of 83 and 82 to afford free keyed, that is, non-rotational sliding movement of the decorating member through opening 84.

The bottom end of rod portion 83 provides a downwardly facing stop 85 for seating at 86 against the upper surface of plate 45, and positions the decorating member 43 at a lowermost position relative to the plates 45, 46. Plate 45 is provided with an opening 87 aligned with opening 84 to permit free sliding movement of rod 82 through opening 87.

The lower end 89 of the rod is provided with means for releasably carrying a decorating element 44 or 90, such carrying means including a transverse port 91 in rod 82 above the bottom end thereof and downwardly facing open ended slot 92 in the bottom end of rod 82. A plastic retaining sleeve 93 slidably covers the port 91 and slot 92 when the upper end of decorating element 90 is assembled with the lower rod portion 89 as hereafter described.

The upper end of decorating element 90 includes a laterally bent end 95 received within port 91, an axially extending portion 96 which lies against the surface of end portion 89 and a laterally bent and return portion 97 which is received within slot 92. When the upper end of element 90 is assembled with the lower end of rod 82, the retaining sleeve 93 may be moved axially over the assembly to hold the upper end portion on the rod 82. The lower end of retainer sleeve 93 is stopped against downward movement by the extension of the return bent portion 97 slightly beyond the cylindrical surface of the lower end 89 of rod 82.

The decorating element 90 may be quickly removed from assembly with the rod 82 by raising sleeve 93 and moving the upper end portion 96 laterally out of engagement with portion 89. The decorating element may be then cleaned and replaced if desired, or a differently configured decorating element 90 may be substituted and reassembled with the rod 82. When the upper portion 96 of element 90 is moved laterally into interengagement with port 91 and slot 92, the sleeve 93 may be lowered thereover to retain the decorating element in assembly. It will be noticed that the shank 98 of the element 90 when assembled with the rod 82 is in axial alignment with rod 82.

Decorating element 90 includes as means for holding a thin film of colorant material a configured or especially shaped decorating element or head 44. In this example, the decorating head 44 is formed by a continuation of the shank 98, said shank being laterally bent at 100 and then bent to form a tear drop shape having an arcuate extremity 101 and relatively straight sides 102. A return portion 103 lies within the configuration of the portions 102 and is terminated in an inwardly turned loop 104. The portions 101, 102, 103, 104 lie in a common plane transverse to the axis of shank 98. The orientation of the plane of decorating head 44 corresponds to the plane of the surface with which the head 44 is to cooperate in the deposition of a thin film of colorant material.

As best seen in the examples of decorating elements shown in FIGS. 8 and 9, the decorating head 44 of the element to the left of FIGS. 8 and 9 lies approximately normal to the axis of the rod 82 and as seen in FIG. 9 may be parallel to the upper surface 30 of dinnerware 31. Another decorating element may have a decorating head 44a having a bent portion indicated at 106 adapted to fit the surface of dinnerware 31 as shown in FIG. 9. Still another decorating head 44b may lie in a plane transversely inclined to the axis of the decorating member to lie parallel with the surface 107 of the rim of the dinnerware 31.

Means for positioning a piece of dinnerware such as 31 in precise registration beneath an assembly of decorating members is best seen in FIGS. 4 and 7. Dinnerware 31 is positioned on the top surface 110 of a carrier member 111 comprising a rectangular flat board 112 having suitable positioning elements 114 on its top surface for snugly receiving and holding dinnerware 31 in a preselected position on the flat board so that when the board is in registration with the station, the dinnerware will be precisely positioned for receiving the design from the decorating member assembly. The board 112 includes a spacer member 115 secured to the bottom surface of the front margin of the board. The spacer member 115 has an inboard face 116 for abutment with the member 54 to limit and determine the position of the rectangular member 112 with respect to the decorating assembly. The member 115 is also provided with end faces 117 which are slidably received between opposed edges 118 of adjacent cleats 56 in order to register the flat plate 112 laterally with respect to the decorating assembly. When a carrier 111 with a piece of dinnerware thereon is moved into position at a decorating station, the carrier member and plate will be precisely positioned with respect to the decorating assembly by the positive stops provided by faces 116 and end faces 117.

The colorant composition material 42 contained in receptacle 41 is of a selected color as determined by the design or pattern to be placed upon the dinnerware 31. Such colorant composition material 41 may comprise glaze compositions for under glazing or over glazing, colored engobes, slip formulations, bulbing stains, and the like. The composition material is flowable and of a selected viscosity which may be controlled by the use of well known additives such as an anionic water-soluble polymer such as Hercules cellulose gum (CMC) which is a purified sodium carboxy methylcellulose which acts as a thickener, binder, stabilizer, protective colloid, and a suspending agent. The cellulose gum is made by Hercules Inc. Another additive which may be used is Macaloid made by Barroid Division, National Lead Company which is a lithium-magnesium hydroxyfluorosilicite having a sodium exchange cation and assists in forming gels and films and absorbs, stabilizes emulsions, thickens and suspends solid in water. The characteristics of a preferred colorant composition material include a uniform flowable aqueous suspension of solid particles which will permit the formulation of a thin surface tension film across the area of the opening, defined by the decorating head.

Characteristics of the selected colorant composition material are correlated to characteristics of the ceramic ware to which it is to be applied. Absorption of a vitreous fired ceramic body may be from 0-4%, of a semi-vitreous ceramic body from 4-15%, and of a porous ceramic body from 15% and above. Control of the viscosity, density and particle suspension of such colorant composition material will permit formation of a preshaped, discrete, pattern part film suspended by surface tension on a decorating head, the film being of uniform thickness and of a precise quantity of colorant material. Uniform accurate deposit of the film on the surface of the ceramic body occurs upon contact of the film with the surface. When the surface of the ceramic ware is porous, capillary action of the porous body causes the colorant material to remain precisely located and positioned on the ceramic surface with spreading and outflow of the film inhibited or minimized. When the ceramic surface is vitrified, non-porous and non-absorptive, the formulation of the colorant composition material may provide for a viscosity and a tackiness so that when the material is placed on the non-porous surface it will remain in place. It will be understood that the selected colorant composition material may include many of the well known standard glaze compositions, bulbing stains, which may or may not be slightly modified in order to provide the desired characteristics of viscosity, surface tension, liquidity, and suspension of solids therein.

In the practice of the method of this invention and using the example of a decorating member as above described, a receptacle 41 containing the selected colorant composition material 42 may be placed in one of the stations 40 in alignment and below the assembly of decorating members 43. As shown in FIG. 1(a), the decorating members are positioned in uppermost retracted position with the upper portion of rod 82 and its keying portion 83 extending through the upper guide plate 46 and with the bottom face 85 of the keying portion 83 in contact with the lower guide plate 45.

While the decorating members 43 maintain the above relation with the plates 45 and 46, the entire assembly may be lowered by the moving means 70 until the decorating heads 44 are just submerged below the surface of the colorant material 42. Such submersion is momentary but sufficient to permit the formation of a film of colorant material which extends across the opening formed by the thin wire portions 102, 101, 103 and 104 of the decorating head 44.

The entire decorating assembly is then withdrawn upwardly to its initial position as shown in FIG. 1(c). Each decorating head 44 carries a precise predetermined amount of colorant composition material 42 retained on the head 44 by the surface tension of the film of colorant material.

While the decorating assembly is in uppermost retracted position, a dinnerware piece 31 is moved into precise registration with the decorating assembly below the decorating heads 44. Such precise registration is provided by the retention of the dinnerware 31 in position on the surface of board 110 and by the moving of the board 110 into contact with the stops 117 and 118 provided on the base of the decorating station. Thus, the plate and the board are in fixed relation and are readily positioned in registration with the decorating assembly.

As shown in FIG. 1(e) and the station 40 at the right of FIG. 4, the decorating assembly may be lowered toward the dinnerware 31. As a decorating head moves into contact with the upper surface of the dinnerware 31, the downward movement of rod 82 is stopped and the guide plates 45 and 46 continue to move downwardly relative thereto until all of the decorating members 43 have been placed in contact with the surface of the dinnerware 31. The rods 82 and their keying portions 83 are freely non-rotatably slidable in the openings provided in plate 46. The decorating head 44 is thus precisely maintained in selected position and in contact with the surface of the ware. In usual operation, such contact of the decorating heads 44 with the surface of the ceramic ware is momentary and only sufficiently long so that all of the decorating members are brought into contact with the surface and so that the surface tension of the film of colorant material carried by the decorating heads is broken by such contact and the precise amount of colorant material deposited in selected position on the surface of the ware. Upon such deposit of the design by each of the decorating heads 44 on the dinnerware, the decorating assembly may be moved upwardly as shown in FIG. 1(f) so that the plate 45 again moves into contact with the stops 85 at the bottom of the keying portions 83 and lifts the decorating members 43 away from and above the surface of the dinnerware. The board carrying the dinnerware may then be slidably moved from beneath the decorating assembly and carried by suitable means to a second station where a different colorant material may be applied to the surface of the dinnerware. FIG. 1(g) illustrates the position of the decorating assembly after decorating the surface of the dinnerware with one of the colors of colorant material which may be applied in the design pattern.

Since the design to be placed upon the dinnerware surface may include more than one color and more than one design configuration, the dinnerware may be moved on the same board to a second station where another decorating assembly similar to that described above but having perhaps different design shapes and a different colorant material may be actuated in the manner described above to deposit at predetermined areas a further part of the design on the surface of the dinnerware. Since the plate, board, and decorating assembly are precisely registered at each station, the completion of an entire design or pattern by the use of one or more design stations is readily accomplished in an accurate manner. The decorating heads at other stations may contact the surface of the dinnerware at areas thereof which have not been previously contacted or in some designs there may be an overlapping of the parts of the design in order to create a desired effect.

It should be noted that in the above description the receptacle 41 contained a colorant material 42 of one selected color. In some instances the receptacle 41 may be divided into receptacle compartments each of which may contain a different selected colorant composition material. The decorating heads 44 aligned above the receptacle compartments may then readily pick up and deposit on the surface of a piece of dinnerware, and at the same time, a pattern containing more than one color.

As mentioned above, the decorating head 44, when submerged in the colorant material provides means for transporting a thin film 120 of the colorant material which extends across the opening defined by the bent wire portions 101, 102, 103 and 104. The film 120 covers the opening by reason of the surface tension characteristics of the film and its ability to hang on to the wire portions 101, 102, 103 and 104. It will be apparent that since the colorant material being applied is transported in the desired shape or configuration of the pattern or design with which the dinnerware surface is to be decorated, that the quantity of such material is precisely determined and is precisely located on the dinnerware surface. It will also be apparent that since the colorant material is being transported by the surface tension thereof that upon immediate contact with the ceramic surface, the surface tension force will be broken and the film 120 will be released from the wire elements 102, 101 and deposited upon the ceramic surface. Thus, precise amounts of colorant material precisely located on the surface of the dinnerware will be deposited upon succeeding pieces of dinnerware for which the same pattern is desired and uniformity of pattern is achieved.

It will be apparent from FIG. 9 that regardless of the three dimensional surface configuration of the surface 30 of the dinnerware 31, that the decorating heads 44 may be readily bent and shaped to conform to such configuration so that the desired deposition of colorant material can be made.

In FIGS. 15–18, a different modification of the decorating assembly is shown. In this embodiment, the pattern or design to be deposited includes a decorating head 124, FIG. 18, which comprises three relatively closely spaced decorating head elements 125, 126 and 127. Each of the elements 125, 126, 127 is carried by respective pairs of decorating rods 128, 129 and 130. Pairs of decorating rods are used for each of the head elements because of the length and size of the head elements in that they would be inaccurately and insufficiently supported by only a single decorating rod as in the first embodiment. The use of pairs of decorating rods for each decorating head permits non-rotatably mounting of the decorating heads by the provision of spaced aligned openings in guide plates 131, 132. A clip or keeper means 134 for each pair of rods is provided with end flanges 135 having spaced ports through which respective decorating rods extend, such clip means 134 being fixed to such rods and serving as stop means for downward movement of the decorating members and decorating heads.

As noted in FIG. 18, adjacent opposed edge margins 125a and 126a and 126a and 127a of the decorating heads are relatively closely laterally spaced as indicated at "b" such that submersion of the heads in the colorant material might form a suspended film extending between the adjacent opposed edge margins and over a surface area not to be decorated by parts of the pattern. To prevent the formation of such a suspended film between the opposed adjacent edge margins of the decorating head elements the center head 126 is vertically spaced below the heads 125, 127 by a distance indicated at "a" FIG. 15. When the decorating heads 125, 126, 127 are then submerged in the colorant composition material, it will be apparent that the vertical space between the head 126 and heads 125, 127 will prevent the formation of a film in such vertical space. The integrity and preciseness of each pattern part deposited by each of heads 125, 126, 127 is thus maintained even though little space is planned between deposited pattern parts.

Each decorating head 125, 126, 127 is formed from a thin, flat sheet of metal provided with a plurality of perforations 137 of circular form arranged in rows or random fashion to provide a lattice 138 having lattice portions between the perforations of narrow width. The external edges of the perforated sheet metal are configured in accordance with the pattern to be applied to the ceramic surface and joining the broken edge lattice portions is a peripheral strip 139 of thin metal to provide a finished edge or boundary to the perforated sheet metal. The thickness of the sheet metal may be in the order of 0.020 inches or less and the edge strip 139 may be 0.008 inches thick. The aggregate open area of the perforations 137 in a decorating head such as 124 comprises a substantial major portion of the area of the decorating head. Thus, when the decorating head 124 is submerged in a colorant composition material, each perforation will be covered with a thin suspended film of the composition material. When the decorating head such as 124 is brought into proximity and contact with the ceramic surface, the plurality of films covering the perforations by surface tension will be released upon the ceramic surface and will substantially uniformly cover that surface within the boundaries of the peripheral strip 139. Thus, the space between adjacent opposed edges 125a and 126a will be free of deposited colorant material and the distinctive pattern or design lines will be retained.

The decorating heads 125, 126, 127 are each readily releasably attached to the pair of decorating members 128, 129, 130 by axially slidable sleeves 140 and cooperable ports and slots as described above with respect to the decorating member 43 and head 44.

The method of using the decorating heads 125, 126, 127 is the same as that described above for the first embodiment of the decorating head of this invention and for brevity such method will not be described with respect to decorating head 124.

The examples of decorating heads described above illustrate different shapes and forms for applying designs in which discrete design parts of different shape and configuration and color may be applied to a surface of ceramic ware at one or more stations. In the decoration of dinnerware, it is often desirable to provide a continuous circumferential colored strip or band at the outer circumference of the rim of the plate or at the inner circumference of the plate rim. FIGS. 19, 20 and 21 illustrate still another embodiment of a decorating head which is adapted to provide by the method and apparatus of this invention such a decorative feature on ceramic dinnerware.

Decorating head 142 may comprise a ring or annulus 143 provided with a plurality of perforations 144 arranged in spaced relation in a line on the annulus 143 and providing a perforated ring having narrow wall portions 145 defining the perforations 144. The annulus 143 has a top face 143a of uniform width and outer and inner circumferential beveled or inclined faces, 143b and 143c which converge toward a cylinder generated by a line rotated about the axis of the annulus at the mean radius of annulus 143. Projection of the inclined faces intersect the cylinder beyond the bottom edge 143d of the annulus so that the contour of the bottom edge as viewed from the side appears scalloped as in FIG. 21. The effect of the scalloped bottom edge 143d is to allow the film to break and move while the bottom edge contacts the ceramic surface and to form a ring of uniform width with irregularities minimized. Such contour also prevents splattering of the film during transfer to the article surface and provides an effective release of the film upon contact and lifting of the annulus.

The annulus 143 is connected by a plurality of circumferentially spaced columns 146 to a cylindrical body 147 which is readily attached to a cylindrical carrier 148. Carrier 148 has a circumferential recess 149 on its outer surface for reception of the body 147 for securement of the body 147 thereto by suitable means such as adhesive.

In this embodiment of the decorating head, the annulus 143, columns 146, and body 147 may be formed integral from a suitable resilient flexible material such as a plastic or a rubber. The resilient flexibility of the annulus 143 and the columns 146 permit the bottom surface 150 of the annulus 143 to adjust for any minor irregularities in the circumferential surface of the rim of the piece of ceramic ware 151. The carrier 148 may include a top wall 153 which may be suitably connected by screw bolt assemblies 154 to forwardly extending arms 155 of the means for moving the decorating head vertically. The actuating means is not described since it is similar to that described in the first embodiment of the invention.

In the practice of the method of this invention with the decorating head 142 it will be noted that the annulus 143 may be submerged into the colorant composition material to obtain the formation of a thin film of colorant material across the openings of the perforations in the annulus. The decorating head is raised, a dinner plate 151 is moved underneath the decorating head in a manner similar to that above described, and the decorating head lowered so that the film of colorant material on the annulus 143 will be contacted by the rim of the dinnerware, released from the annulus, and deposited on the rim surface of the dinnerware.

In FIGS. 22, 23, still another modification of the decorating head is shown. In this example, a small circle or annulus is provided by forming two concentric circular wire elements 160, 161 which are attached to a rod 162 carried by a decorating member of construction similar to that shown in FIG. 14. In this example a receptacle 163 is provided with an upstanding pointed dowel 164 having a diameter less than the diameter of the inner wire ring 161.

In this embodiment of the decorating head when the rings 160, 161 are submerged in the colorant material in the receptacle 163, the submersion is made with the pointed dowel 164 extending through the opening defined by the inner wire ring 161 so that a thin film of colorant material is prevented from extending across the inner diameter of the decorating head. The space between the concentric rings 161 and 160 has a film of colorant material extending thereacross so that when the decorating head is applied to the surface of a ceramic dinnerware a circular annular design will be applied to the ceramic surface. It will be understood that while concentric wire elements have been described in this modification of the decorating head, that any other planar geometric form may also be used since the pointed dowel 161 will pierce and release a film of colorant material across the inner opening of such a geometric form.

It will be understood that the method of this invention affords a number of advantages in the decoration of ceramic ware. The method provides for the application of accurate repetitive uniform decorative patterns at a relatively high rate of application. The exemplary apparatus described above clearly illustrates one type of apparatus for accomplishing the vertical reciprocal movement of the decorating heads and the positioning and transfer of ceramic ware being decorated into a decorating station and between a plurality of decorating stations. It will be understood by those skilled in the art that such method steps may be readily converted into an apparatus comprising a rotatable carousel which is indexed to stop at decorating stations or automation may be provided by a linear type production line in which the ware to be decorated is readily transferred along and to a plurality of decorating stations.

One of the advantages of the method of this invention as described above is the application of very small vertical forces to the ceramic surface being decorated. It should be noted that when the decorating assembly is lowered into contact with the surface to be decorated, the contact made involves only the gravitational weight force of the decorating assembly or individual decorating heads. Such gravitational force contact is spread over the configuration of the pattern part being applied. Since the ware to be decorated may be of dry pressed form, it will be readily understood that the application of any substantial force thereto as by a spring biased decorating head may cause fragmentation of the dry pressed form. In many instances the ceramic body is quite fragile and is readily subject to chipping, cracking or breaking. The application of the decorative pattern to such a ceramic body under lightly and momentarily applied gravitational force of the decorating element only has served to reduce and minimize breakage of such ceramic bodies.

Another advantage of the method of this invention is that the decorating heads, which may be made of any suitable material such as wire, stainless steel wire, rigid and flexible plastic filament material, and other types of material, are capable of retaining a selected shape and having dimensional stability. Such decorating heads may be readily shaped to conform to the contour and curvature of a surface to be decorated. Such decorating heads lend themselves to the creation of pattern and design shapes and combinations thereof which are limited only by the creativity of the designer.

Another important advantage of the method and apparatus of this invention is the facility by which multipart designs or patterns can be created in one or more colors, uniformly reproduced on a plurality of ceramic ware. Each discrete design or pattern part represented by a decorating head, when dipped in the colorant composition material selected for the particular ceramic body being decorated, will remove from a receptacle containing the colorant material only a precise quantity of such material in a predetermined discrete shape which depends upon the characteristic of the colorant composition material and the thickness of the wire element forming the design shape. The film of colorant material established on the decorating head is formed by surface tension and has a uniform thickness of colorant material which is repetitively reproducible each time the decorating head is dipped into the colorant material as long as the decorating heads are maintained in proper condition, that is, clean and without the deposit of substance which might prevent and destroy the surface tension characteristics of the colorant material. Since release of the film occurs upon contact of the film with the ceramic surface and is not dependent upon other conditions or forces, the deposit of the colorant material is uniform and within the shape or configuration of the decorating head. Breaking of the surface tension of the film by contact with the ceramic surface produces a clean release or break of the material from the decorating head. It should be noted that since the amount of colorant material carried by the decorating head is dependent upon the surface tension of the colorant material and the thickness of the wire of the head, that since these characteristics do not change in the application of repetitive designs, virtually the same amount of colorant material will be deposited on repetitive patterns placed upon a plurality of ceramic wire. Another advantage of the use of the surface tension characteristics of the film in the method of this invention is that the thickness of the film is substantially uniform and the deposit thereof on a ceramic surface reduces and minimizes the occurence of blisters or other irregularities which attend the application of a liquid colorant material to a surface.

It will be understood that the deposition of a decorative pattern on ceramic ware by the method of this invention provides a deposited configuration which approaches the appearance of a careful skilled hand application of the colorant material. It will be understood that depending upon the pattern to be applied to the ceramic surface, that at different stations and applications of colorant material, there may be some overlapping of designs if desired so that the colorant material will blend and merge one with the other during firing.

The method of the invention described above also includes positive means for preventing the formation of a film of colorant material between discrete parts of a design or pattern as by piercing an unwanted film between adjacent boundaries of such discrete parts or by vertically spacing such discrete parts in the decorating head element.

The above description has been primarily directed to the application of a pattern to a surface of a porous and/or nonporous ceramic body. It will be apparent that deposit of the pattern by the method of this invention on a vitrified or hard nonporous ceramic surface is very similar to deposit of the pattern on other types of hard nonporous surfaces on other materials such as glass, metal, used in table ware and art ware. Therefore the invention contemplates that the term "ceramic surface", includes surfaces on materials other than ceramic.

Various modifications and changes may be made in the apparatus and the method of this invention described above and all such changes and modifications coming within the spirit of this invention and coming within the scope of the appended claims are embraced thereby.

I claim:

1. Means for decorating a surface area of a ceramic body in which the surface area may vary in elevation as a result of design and tolerances, the combination of:

a plurality of decorating members arranged to define a design for deposit on said surface area;

each decorating member having a support and guide rod provided with a fixed stop face;

means supporting and guiding said decorating members for vertical non-rotational movement of the members along parallel vertical paths above a receptacle adapted to contain colorant composition material;

means for removably positioning said ceramic body in registration with the design defined by said plurality of decorating members and above said receptacle;

said supporting and guiding means being reciprocally movable only in a vertical direction for movement of said decorating members along said parallel vertical paths with said stop face on each member in resting contact therewith without relative movement of said decorating members with respect to said supporting and guiding means, whereby said decorating members are adapted to pick up composition material from said receptacle and said decorating members are carried to a raised position located above the position of the positioning means for said ceramic body;

said supporting and guide means and said support and guide rods on said decorating members having means to provide during lowering of the supporting and guide means and upon gravitational contact of said decorating members with said surface area unrestricted free vertical downward movement of the supporting and guide means with respect to said decorating members during deposit of said composition material on said surface area, said stop face on each decorating member being displaceable into spaced relation with said supporting and guiding means to compensate for variations in the surface area.

2. A means as claimed in claim 1 wherein said supporting means for said decorator members includes vertically spaced horizontal support bars, said support and guide rods on said decorator members extending between and through said spaced support bars, one of said horizontal bars having said contact with said stop face and serving to limit relative downward vertical movement of said decorating members with respect to said support bars, the other of said bars serving to guide said decorator members when said decorating members move relative to said bars in an upward vertical direction and upon contact of said decorating members with said surface area.

3. A means as stated in claim 1 wherein said decorating members include decorating ends having design portions arranged in vertically spaced relation to prevent establishment of a film of colorant composition material between said spaced design portions.

4. An apparatus for decorating a surface of a ceramic body comprising in combination:

a plurality of decorating stations, each decorating station including a receptacle at said station adapted to contain colorant composition material to be applied to said surface of said ceramic body, a plurality of decorating members for holding thin films of said colorant composition material suspended across openings having selected shapes corresponding to the design which is to be applied to said surface, support means including vertically spaced support members at each station for supporting and guiding said decorating members, means for reciprocally moving said support means in a vertical direction only, said support means and said decorating members having means for holding said decorating members in selected position with respect to each other for permitting said decorating members to be immersed in said colorant composition material in said receptacle for suspending thin films of said composition material across openings of said decorating members, each of said holding means being inoperable to maintain said selected position with respect to downward vertical movement of said support means upon and after gravitational contact of each decorator member with the surface of the ceramic body, whereby said suspended films on said decorating members are adapted to adjust to variations in the surface to be decorated for release of said films.

* * * * *